US009033520B2

(12) United States Patent
Maruyama

(10) Patent No.: US 9,033,520 B2
(45) Date of Patent: May 19, 2015

(54) PROJECTOR, AND CONTROL METHOD THEREOF

(75) Inventor: Shunji Maruyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 357 days.

(21) Appl. No.: 13/414,148

(22) Filed: Mar. 7, 2012

(65) Prior Publication Data

US 2012/0236270 A1    Sep. 20, 2012

(30) Foreign Application Priority Data

Mar. 15, 2011    (JP) ................................. 2011-056263

(51) Int. Cl.
| | |
|---|---|
| *G03B 21/14* | (2006.01) |
| *G09G 5/00* | (2006.01) |
| *H04N 11/20* | (2006.01) |
| *H04N 5/46* | (2006.01) |
| *H04N 9/31* | (2006.01) |
| *H04N 5/262* | (2006.01) |
| *H04N 21/2343* | (2011.01) |
| *G03B 21/53* | (2006.01) |

(52) U.S. Cl.
CPC .............. *G03B 21/142* (2013.01); *H04N 9/317* (2013.01); *H04N 5/2628* (2013.01); *H04N 21/234372* (2013.01); *G03B 21/53* (2013.01)
348/445; 348/556

(58) Field of Classification Search
CPC ................ H04N 9/317; H04N 5/2628; H04N 21/234372; G03B 21/142; G03B 21/53; G03B 2205/0046

USPC .................. 353/101, 121; 345/667, 682, 745; 348/445, 556
See application file for complete search history.

(56) References Cited

U.S. PATENT DOCUMENTS

| | | | |
|---|---|---|---|
| 2004/0021799 A1* | 2/2004 | Matsuda ....................... | 348/744 |
| 2009/0225235 A1 | 9/2009 | Fujisaki et al. | |
| 2011/0157487 A1* | 6/2011 | Akeyama ...................... | 348/759 |
| 2012/0236271 A1 | 9/2012 | Maruyama | |

FOREIGN PATENT DOCUMENTS

| | | |
|---|---|---|
| CN | 101527802 A | 9/2009 |
| JP | 2003-295321 A | 10/2003 |
| WO | WO-2010-023868 A | 3/2010 |

* cited by examiner

*Primary Examiner* — Toan Ton
*Assistant Examiner* — Magda Cruz
(74) *Attorney, Agent, or Firm* — ALG Intellectual Property, LLC

(57) ABSTRACT

A projector includes a lens adjustment mechanism that performs a predetermined adjustment operation for a projection lens, an adjustment value storage unit that stores lens adjustment values for performing the predetermined adjustment operation by linking the lens adjustment values to the type of aspect ratio of an image signal, a signal aspect ratio recognition unit that recognizes the aspect ratio of the image signal input to an input terminal as a signal aspect ratio, an adjustment value acquisition unit that acquires, from the adjustment value storage unit, the lens adjustment values corresponding to the type of signal aspect ratio recognized by the signal aspect ratio recognition unit, and an adjustment control unit that causes the lens adjustment mechanism to perform a lens adjustment operation based on the lens adjustment values acquired by the adjustment value acquisition unit.

19 Claims, 9 Drawing Sheets

(ADJUSTMENT VALUE STORAGE UNIT) 22

| SIGNAL ASPECT RATIO | FOCUS ADJUSTMENT VALUE | ZOOM ADJUSTMENT VALUE | LENS SHIFT ADJUSTMENT VALUE |
|---|---|---|---|
| 4 : 3 | 10 | 20 | 15 |
| 16 : 9 | 12 | 17 | 14 |

[ADJUSTMENT VALUE STORAGE UNIT]

| INPUT TERMINAL / INPUT SIGNAL | COMPUTER | | | VIDEO | | | HDMI | | |
|---|---|---|---|---|---|---|---|---|---|
| SIGNAL ASPECT RATIO | FOCUS ADJUSTMENT VALUE | ZOOM ADJUSTMENT VALUE | LENS SHIFT ADJUSTMENT VALUE | FOCUS ADJUSTMENT VALUE | ZOOM ADJUSTMENT VALUE | LENS SHIFT ADJUSTMENT VALUE | FOCUS ADJUSTMENT VALUE | ZOOM ADJUSTMENT VALUE | LENS SHIFT ADJUSTMENT VALUE |
| 4:3 | 10 | 20 | 15 | 12 | 17 | 14 | 10 | 20 | 15 |
| 16:9 | 12 | 17 | 14 | 12 | 17 | 14 | 12 | 17 | 14 |

FIG. 5

(SELECTION ASPECT RATIO CORRESPONDENCE
ADJUSTMENT VALUE STORAGE UNIT ) 27

| SELECTION ASPECT RATIO | FOCUS ADJUSTMENT VALUE | ZOOM ADJUSTMENT VALUE | LENS SHIFT ADJUSTMENT VALUE |
|---|---|---|---|
| NORMAL | 10 | 20 | 15 |
| FULL | 12 | 17 | 14 |
| ZOOM | 10 | 20 | 15 |
| REAL | 12 | 24 | 12 |

PROJECTOR, AND CONTROL METHOD THEREOF

BACKGROUND

1. Technical Field

The present invention relates to a projector, and a control method thereof.

2. Related Art

In recent years, a projector which includes an adjustment mechanism of an optical system (lens) such as zooming, focusing, lens-shifting, or the like has become known. JP-A-2003-295321 discloses a projector controller in which a plurality of sets of parameters (lens adjustment values) for adjusting the optical system including zooming, focusing, lens-shifting, or the like are stored in a memory, a desired parameter set is selected therefrom, and the optical system is adjusted according to each parameter of the selected parameter set. A projector of such a type is advantageous in a case where the projector is fixedly installed, and a plurality of screens are used by being switched according to projection images. For example, since images signals (input images) have aspect ratios of 4:3 and 16:9, there are screen types of 4:3, 16:9, and the like corresponding to the image signals. When the type of screen is switched for the use, it is possible to correct deviation of display positions caused by switching of the screen in such a way that sets of parameters are changed to adjust the lens positions.

However, in the projector of the related art, there was a case where it was not possible to ascertain lens adjustment values (sets of parameters) stored in the memory. In other words, it was necessary for a user to memorize what lens adjustment values had been stored in the memory. However, since it was difficult for the user to memorize the lens adjustment values, a projector has been demanded which can perform the adjustment of the optical system by selecting the lens adjustment values with ease.

SUMMARY

An advantage of some aspects of the invention is to solve at least a part of the problems described above, and the invention can be implemented as the following forms or application examples.

An application example of the invention is directed to a projector including a light source, a light modulation device that modulates light emitted from the light source into image light according to an image signal, a projection lens that projects the image light modulated by the light modulation device, a lens adjustment mechanism that performs a predetermined adjustment operation for the projection lens, an adjustment value storage unit that stores lens adjustment values for causing the lens adjustment mechanism to perform the predetermined adjustment operation by linking the lens adjustment values to the type of aspect ratio of the image signal, an input terminal unit that includes an input terminal into which the image signal is input, a signal aspect ratio recognition unit that recognizes the aspect ratio of the image signal input to the input terminal, an adjustment value acquisition unit that acquires, from the adjustment value storage unit, the lens adjustment values corresponding to the type of aspect ratio recognized by the signal aspect ratio recognition unit; and an adjustment control unit that causes the lens adjustment mechanism to perform a lens adjustment operation based on the lens adjustment values acquired by the adjustment value acquisition unit.

According to the projector as above, the lens adjustment mechanism performs a predetermined adjustment operation for the projection lens. The adjustment value storage unit stores the lens adjustment values by linking the lens adjustment values to the types of aspect ratio. The signal aspect ratio recognition unit recognizes the aspect ratio of the input image signal. The adjustment value acquisition unit acquires, from the adjustment value storage unit, the lens adjustment values corresponding to the aspect ratio of the input image signal. In addition, the adjustment control unit causes the lens adjustment mechanism to perform a lens adjustment operation based on the acquired lens adjustment values. Accordingly, since the projector performs the lens adjustment operation corresponding to the type of aspect ratio of the input image signal, it is possible to simplify a user operation for lens adjustment.

According to the projector described above, the predetermined adjustment operation may be at least one of the focus adjustment operation, the zoom adjustment operation, and the lens shift adjustment operation. Accordingly, since the projector performs the focus adjustment operation, the zoom adjustment operation, and the lens shift adjustment operation based on the lens adjustment values corresponding to the signal aspect ratio of the input image signal, it is possible to simplify a user operation for lens adjustment.

According to the projector described above, the adjustment value storage unit may store the lens adjustment values by linking the lens adjustment values to the type of aspect ratio of the image signal and the type of input terminal. Then, the adjustment value selection unit selects lens adjustment values corresponding to the type of aspect ratio of the image signal and the type of input terminal. Accordingly, since the projector performs the lens adjustment operation corresponding to the type of signal aspect ratio of the input image signal and the type of input terminal, it is possible to simplify a user operation for lens adjustment.

The projector described above may further include an aspect ratio selection unit which helps the user to select the aspect ratio (selection aspect ratio) of image light projected by the projection lens, an image aspect ratio conversion unit which performs image conversion so as to attain the selection aspect ratio, and a selection aspect ratio correspondence adjustment value storage unit which stores the lens adjustment values by linking the lens adjustment values to the types of selection aspect ratios that are selectable. When a selection aspect ratio is selected by the aspect ratio selection unit, the adjustment value selection unit select, from the selection aspect ratio correspondence adjustment value storage unit the lens adjustment values corresponding to the selection aspect ratio. Accordingly, since the projector performs the lens adjustment operation corresponding to the selection aspect ratio that is selected, it is possible to simplify a user operation for lens adjustment.

The projector described above may further include a storage control unit which causes the adjustment value storage unit to store the lens adjustment values by linking the lens adjustment values to the type of signal aspect ratio of the image signal input to the input terminal at the time when the lens adjustment values are stored in the adjustment value storage unit. Accordingly, since the lens adjustment values are stored by being linked to the aspect ratio of the image signal that is being subject to adjustment, the user can perform the adjustment operation without confusion.

According to the projector described above, if the selection of the type of aspect ratio to be stored by being linked to the lens adjustment values is received, the storage control unit may cause the adjustment value storage unit to store the lens adjustment values by linking the lens adjustment values to the type of selected aspect ratio. Accordingly, since it is possible to store the lens adjustment values by being linked to a desired aspect ratio, user convenience improves.

According to the projector described above, the storage control unit may cause the adjustment value storage unit to store the lens adjustment values by linking the lens adjustment values to the type of input terminal and the type of signal aspect ratio of the image signal input to the input terminal at the time when the lens adjustment values are stored in the adjustment value storage unit. Accordingly, since the lens adjustment values are stored by being linked to the input terminal and the aspect ratio of the image signal that is being subject to adjustment, the user can perform an adjustment operation without confusion.

According to the projector described above, if selection of the type of aspect ratio and the type of input terminal for storing by being linked to the lens adjustment values is received, the storage control unit may cause the adjustment value storage unit to store the lens adjustment values by linking the lens adjustment values to the selected type of aspect ratio and the type of input terminal. Accordingly, since it is possible to store the lens adjustment values by being linked to the desired aspect ratio and input terminal, user convenience improves.

According to the projector described above, the storage control unit may receive selection of the type of selection aspect ratio for storing the lens adjustment values by linking thereto, and causes the adjustment value storage unit to store the lens adjustment values by linking the lens adjustment values to the type of selection aspect ratio selected. Accordingly, since it is possible to cause the lens adjustment values to be stored by being linked to the desired selection aspect ratio, user convenience improves.

Another application example of the invention is directed to a control method of a projector. In the control method, the projector performs the lens adjustment operation corresponding to the type of signal aspect ratio of the input image signal, it is possible to simplify a user operation for lens adjustment.

When the above-described projector and the control method thereof are established using a computer provided in the projector, the above-described embodiments and application examples can be configured to be in a form of a program for realizing the functions thereof or a recording medium in which the program is recorded to be readable by the computer. As the recording medium, it is possible to use various media that are readable by the computer, including a flexible disk, a hard disk, a CD-ROM (Compact Disc Read Only Memory), a DVD (Digital Versatile Disc), a Blu-ray Disc (registered trademark), a magneto-optical disc, a non-volatile memory card, an internal storage device (a semiconductor memory including a RAM (Random Access Memory), a ROM (Read Only Memory), or the like) of the projector, an external storage device (a USB (Universal Serial Bus) memory, or the like), and the like.

BRIEF DESCRIPTION OF THE DRAWINGS

The invention will be described with reference to the accompanying drawings, wherein like numbers reference like elements.

FIG. 5 is a descriptive diagram of an adjustment value storage unit according to a second embodiment.

DESCRIPTION OF EXEMPLARY EMBODIMENTS

Hereinafter, embodiments will be described.

First Embodiment

In a first embodiment, a projector will be described which, when the aspect ratio of an input image signal (signal aspect ratio) is changed, performs a lens adjustment operation based on lens adjustment values corresponding to the signal aspect ratio.

Figure 1:
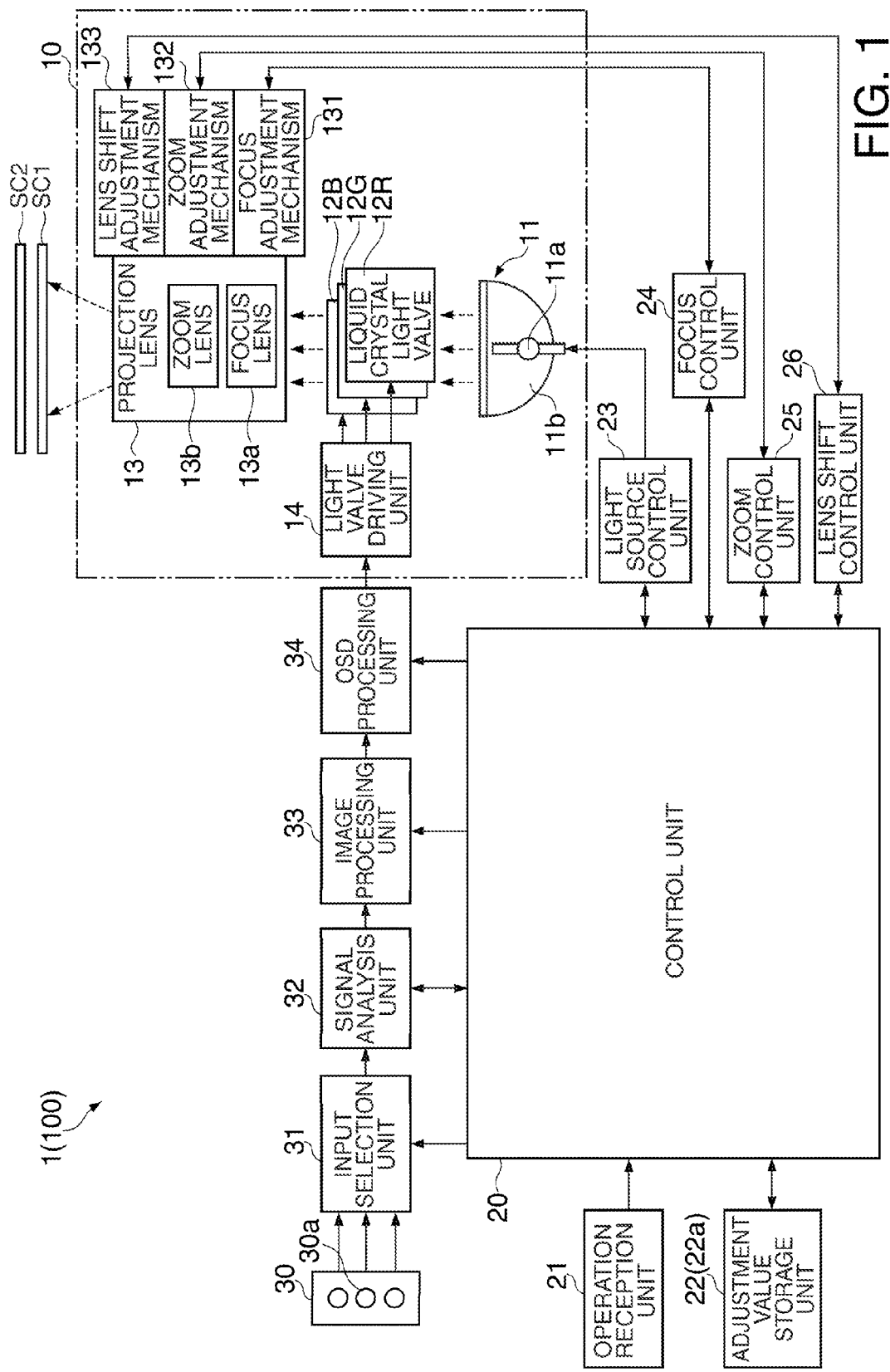
FIG. 1 is a block diagram showing a circuit configuration of a projector according to a first embodiment.

FIG. 1 is a block diagram showing a circuit configuration of the projector according to the first embodiment. The internal configuration of the projector 1 will be described with reference to FIG. 1.

The projector 1 includes an image projection unit 10, a control unit 20, an operation reception unit 21, an adjustment value storage unit 22, a light source control unit 23, a focus control unit 24, a zoom control unit 25, a lens shift control unit 26, an input terminal unit 30, an input selection unit 31, a signal analysis unit 32, an image processing unit 33, an OSD (On-Screen Display) processing unit 34, and the like.

The image projection unit 10 includes a light source 11, three liquid crystal light valves 12R, 12G, and 12B as light modulators, a projection lens 13, a light valve driving unit 14, a focus adjustment mechanism 131, a zoom adjustment mechanism 132, a lens shift adjustment mechanism 133, and the like. The image projection unit 10 forms image light by causing light emitted from the light source 11 to be modulated in the liquid crystal light valves 12R, 12G, and 12B, then projects the image light from the projection lens 13, and causes the image light to be displayed on a screen SC1 or SC2. Herein, in the embodiment, the screen SC1 is set to be a screen having an aspect ratio of 4:3, and the screen SC2 is set to be a screen having an aspect ratio of 16:9.

The light source 11 is configured to include a discharge type light source lamp 11a including an extra-high-pressure mercury lamp, a metal halide lamp, and the like, and a reflector 11b which reflects light radiated from the light source lamp 11a to the liquid crystal light valves 12R, 12G, and 12B side. Light emitted from the light source 11 is converted to light having substantially uniform luminance distribution by an integrator optical system which is not shown in the drawing, separated into each colored light component of three colors of light including red R, green G, and blue B by a color separation optical system that is not shown in the drawing, and respectively incident to the liquid crystal light valves 12R, 12G, and 12B.

The liquid crystal light valves 12R, 12G, and 12B are constituted by liquid crystal panels formed by injecting liquid crystals in between a pair of transparent substrates. In the liquid crystal light valves 12R, 12G, and 12B, a plurality of pixels (not shown in the drawing) that are arranged in a matrix shape are formed, and a driving voltage can be applied to the liquid crystals for each pixel. If the light valve driving unit 14 applies a driving voltage to each pixel according to input image information, each pixel is set to have an optical transmittance according to the image information. For this reason, the light emitted from the light source 11 is modulated after transmitting through the liquid crystal light valves 12R, 12G, and 12B, and images according to the image information are formed for each colored light beam. Formed images of each color are synthesized for each pixel by a color synthesizing optical system that is not shown in the drawing so as to become a color image, and the image is projected from the projection lens 13.

The projection lens 13 has a focus lens 13a, and enables focusing (focus adjustment) by moving the position of the focus lens 13. In addition, the projection lens 13 has a zoom lens 13b, and enables the adjustment of a projection view angle by changing a zooming state.

The focus adjustment mechanism 131 is constituted by a motor, a gear, and the like, drives (moves) the focus lens 13a, and performs focus adjustment based on the control of the focus control unit 24. In addition, the focus adjustment mechanism 131 detects the position of the focus lens 13a as a focus adjustment value (focus amount). Then, the focus adjustment mechanism 131 outputs the focus adjustment value that is the detection result to the focus control unit 24. In the embodiment, as a method for detecting the focus adjustment value, the amount of change of the position of the focus lens 13a is detected by an encoder, or the like. As another method for detecting the focus adjustment value, the motor of the focus adjustment mechanism 131 may be set to be a stepping motor so as to detect the value based on the number of steps of the stepping motor.

The zoom adjustment mechanism 132 is constituted by a motor, a gear, and the like, drives (moves) the zoom lens 13b, and performs zoom adjustment based on the control of the zoom control unit 25. In addition, the zoom adjustment mechanism 132 detects the zooming state of the zoom lens 13b as a zoom adjustment value (zoom amount). Then, the zoom adjustment mechanism 132 outputs the zoom adjustment value that is the detection result to the zoom control unit 25. In the embodiment, as a method for detecting the zoom adjustment value, the amount of change of the zooming state of the zoom lens 13b is detected by an encoder, or the like. Furthermore, as another method for detecting the zoom adjustment value, the motor of the zoom adjustment mechanism 132 may be set to be a stepping motor so as to detect the value based on the number of steps of the stepping motor.

The lens shift adjustment mechanism 133 is constituted by a motor, a gear, and the like that cause the projection lens 13 to move, causes the projection lens 13 to move based on the control of the lens shift control unit 26, and accordingly changes the projection position of the projection image. In addition, the lens shift adjustment mechanism 133 detects a lens shift state of the projection lens 13 as a lens shift adjustment value (lens shift amount). Then, the lens shift adjustment mechanism 133 outputs the lens shift adjustment value that is the detection result to the lens shift control unit 26. In the embodiment, as a method for detecting the lens shift adjustment value, the amount of change of the position of the projection lens 13 is detected by an encoder, or the like. Furthermore, as another method for detecting the lens shift adjustment value, the motor of the lens shift adjustment mechanism 133 may be set to a stepping motor so as to detect the value based on the number of steps of the stepping motor.

The above-described focus adjustment mechanism 131, zoom adjustment mechanism 132, and lens shift adjustment mechanism 133 correspond to a lens adjustment mechanism.

The control unit 20 includes a CPU (Central Processing Unit), a RAM which is used for temporarily storing various data, a non-volatile memory such as a mask ROM or a flash memory, a FeRAM (Ferroelectric RAM: Ferroelectric Random Access Memory), and the like (none of which are not shown in the drawing), and functions as a computer. The control unit 20 controls the overall operation of the projector 1 by the operation of the CPU according to a control program stored in the non-volatile memory.

The operation reception unit 21 receives an input operation from a user, and includes a plurality of operation keys used by the user to give various instructions to the projector 1. As the operation keys included in the operation reception unit 21, there are a power supply key for switching power on or off, an input switching key for switching an input image signal, a focus adjustment key for performing focus adjustment, a zoom adjustment key for performing zoom adjustment, a lens shift adjustment key for performing lens shift adjustment, a projection aspect ratio switching key for switching the aspect ratio of projected image light, a menu key for switching between display or non-display of the menu screen used for various settings, a cursor key used for moving the cursor on the menu screen, or the like, a decision key for deciding various settings, and the like. If the user operates (presses down) various operation keys of the operation reception unit 21, the operation reception unit 21 receives the input operation, and outputs an operation signal to the control unit 20 in accordance with the operation details of the user.

Furthermore, as the operation reception unit 21, a configuration using a remote controller (not shown in the drawing) that enables a remote operation may be set. In this case, the remote controller sends an operation signal such as infrared rays in accordance with the operation details of the user, and a remote controller signal reception unit that is not shown in the drawing receives the signal to transmit to the control unit 20.

The adjustment value storage unit 22 includes a non-volatile memory, and stores focus adjustment values, zoom adjustment values, and lens shift adjustment values corresponding to the signal aspect ratio of an image signal. The control unit 20 takes charge of writing the focus adjustment values, the zoom adjustment values, and the lens shift adjustment values into the adjustment value storage unit 22. In addition, the control unit 20 reads the stored focus adjustment values, zoom adjustment values, and lens shift adjustment values.

Herein, the adjustment value storage unit 22 will be described.

Figures 2, 3:
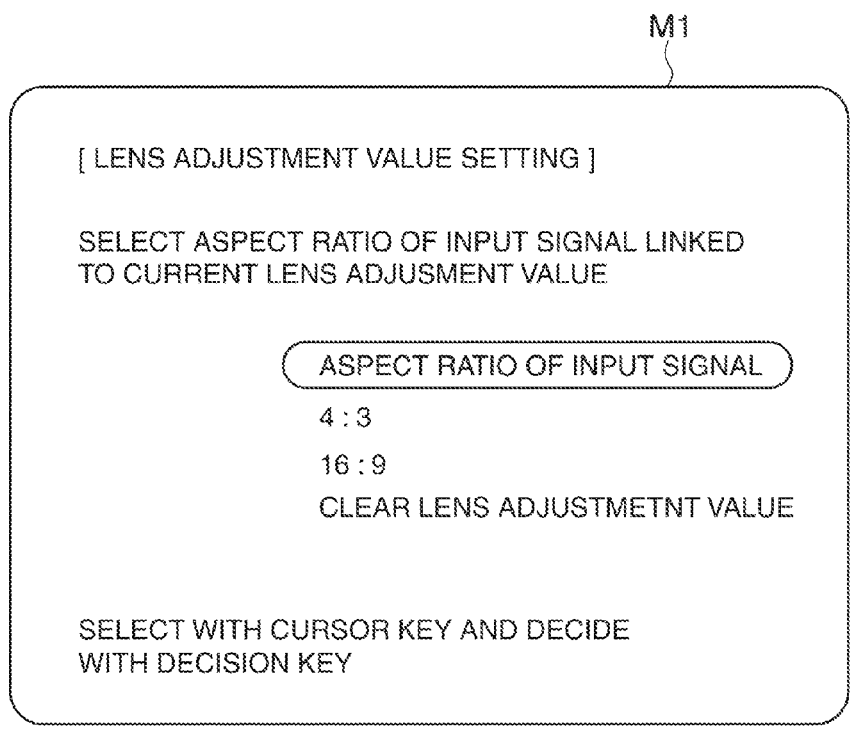
FIG. 2 is a descriptive diagram of an adjustment value storage unit.
FIG. 3 is a descriptive diagram of a lens adjustment value setting screen.

FIG. 2 is a descriptive diagram of the adjustment value storage unit 22. As shown in FIG. 2, the adjustment value storage unit 22 stores the focus adjustment values, the zoom adjustment values, and the lens shift adjustment values as lens adjustment values corresponding to the types of signal aspect ratios. As the types of signal aspect ratios, the projector 1 of the embodiment includes "4:3" and "16:9". In addition, the focus adjustment values, the zoom adjustment values, and the lens shift adjustment values are stored corresponding to each of the types of signal aspect ratios. Furthermore, the types of signal aspect ratios are not limited to the above, and may include other types of the signal aspect ratios. In addition, the adjustment value storage unit 22 may store lens adjustment values corresponding to other types of the signal aspect ratios.

Herein, a setting screen for causing the adjustment value storage unit 22 to store the lens adjustment values by being linked to the types of signal aspect ratios will be described.

FIG. 3 is a descriptive diagram of a setting screen of the lens adjustment values for setting the lens adjustment values linked to the types of signal aspect ratios. A lens adjustment value setting screen M1 is displayed in such a way that the user presses down the menu key provided in the operation reception unit 21 to perform a specific operation. In the embodiment, the lens adjustment value setting screen M1 is set to be an OSD display, and is caused to be displayed by the control unit 20 giving an instruction to an OSD processing unit 34 to be described later.

As shown in FIG. 3, in the uppermost part of the lens adjustment value setting screen M1, the character array of "lens adjustment value setting" indicating a lens adjustment value setting screen is displayed. Below the character array, another character array of "Select the aspect ratio of the input signal to be linked to the current lens adjustment value" that encourages selection of a signal aspect ratio to be linked to the lens adjustment values is displayed. Furthermore, in the center of the screen, options of "aspect ratio of input signal", "4:3", "16:9", and "clear lens adjustment value" are displayed. In addition, in the lower part of the screen, explanation of a key input procedure is displayed.

If the user operates the operation reception unit 21, selects the "aspect ratio of input signal", "4:3", or "16:9", on the screen, and makes a decision with the decision key, the control unit 20 forms a link of the current lens adjustment values (focus adjustment values, zoom adjustment values, and lens shift adjustment values) to the selection aspect ratio, and causes the adjustment value storage unit 22 to store the result. The operation reception unit 21 and the control unit 20 at this time correspond to a storage control unit. Herein, the "aspect ratio of input signal" is a signal aspect ratio of the image signal that is currently input. Furthermore, in the embodiment, the default of the options is set to the "aspect ratio of input signal". In addition, if "clear lens adjustment value" is selected, the control unit 20 deletes (clears) all lens adjustment values stored in the adjustment value storage unit 22. In other words, a state is set in which lens adjustment values are not stored. Furthermore, the lens adjustment values stored in the adjustment value storage unit 22 may be set to be deleted (cleared) for each signal aspect ratio. For example, it is possible for a screen (not shown in the drawing) for deleting lens adjustment values to be displayed, a signal aspect ratio is selected by the user, and lens adjustment values linked to the selected signal aspect ratio are deleted.

Returning to FIG. 1, the light source control unit 23 includes an inverter (not shown in the drawing) that converts a DC current generated in a power source circuit (not shown in the drawing) into an AC rectangular wave current, an igniter (not shown in the drawing) that prompts the start of the light source lamp 11a by performing insulation breakdown between electrodes of the light source lamp 11a, and controls turning-on of the light source 11 based on an instruction of the control unit 20. Specifically, the light source control unit 23 can cause the light source 11 to turn on by starting the light source 11 and supplying predetermined electric power, and cause the light source 11 to turn off by stopping supply of power. In addition, the light source control unit 23 can adjust luminance (brightness) of the light source 11 by controlling power supplied to the light source 11 based on an instruction of the control unit 20.

The focus control unit 24 causes the focus lens 13a to move by controlling the focus adjustment mechanism 131 based on an instruction of the control unit 20 to perform focus adjustment. In addition, the focus control unit 24 inputs focus adjustment values from the focus adjustment mechanism 131 and outputs the values to the control unit 20.

The zoom control unit 25 causes the zoom lens 13b to move by controlling the zoom adjustment mechanism 132 based on an instruction of the control unit 20 to perform zoom adjustment. In addition, the zoom control unit 25 inputs zoom adjustment values from the zoom adjustment mechanism 132 and outputs the values to the control unit 20.

The lens shift control unit 26 causes the projection lens 13 to move by controlling the lens shift adjustment mechanism 133 based on an instruction of the control unit 20 to perform lens shift adjustment. In addition, the lens shift control unit 26 inputs lens shift adjustment values from the lens shift adjustment mechanism 133 and outputs the values to the control unit 20.

The input terminal unit 30 includes a plurality of input terminals 30a that can input image signals in various forms from external image supply devices that are not shown in the drawing, such as a personal computer, a video reproduction device, a memory card, a USB storage, a digital camera, or the like. Image signals input to each input terminal 30a are supplied to the input selection unit 31.

The input selection unit 31 selects one input terminal 30a among the plurality of input terminals 30a based on an instruction of the control unit 20, and outputs the information to the signal analysis unit 32. If the user designates a desired input terminal 30a by operating the input switch key provided in the operation reception unit 21, the control unit 20 instructs the input selection unit 31 so that the image signal input to the input terminal 30a is output to signal analysis unit 32. Furthermore, the user can also select an input terminal 30a into which the image signal is not input.

The signal analysis unit 32 analyzes the image signal input from the input selection unit 31, converts the result into image information in a form that can be processed by the image processing unit 33, and outputs the result to the image processing unit 33 based on an instruction of the control unit 20. Herein, the signal analysis unit 32 recognizes the aspect ratio of the input image signal, that is, the signal aspect ratio. In addition, the signal analysis unit 32 informs the control unit 20 of the signal aspect ratio. The signal analysis unit 32 at that time corresponds to a signal aspect ratio recognition unit.

The image processing unit 33 converts the image information input from the signal analysis unit 32 into image data indicating the grayscale of each pixel of the liquid crystal light valves 12R, 12G, and 12B. Herein, the converted image data is constituted by separate colored light of R, G, and B, and includes a plurality of pixel values corresponding to all the pixels of each of the liquid crystal light valves 12R, 12G, and 12B. The pixel value is for determining an optical transmittance of the corresponding pixel, and the pixel values are used to regulate the intensity (grayscale) of light emitted from each pixel. In addition, the image processing unit 33 converts the aspect ratio of the image data based on an instruction of the control unit 20. Furthermore, the image processing unit 33 performs an image quality adjustment process for adjusting brightness, contrast, sharpness, hue, and the like for the converted image data based on an instruction of the control unit 20, and outputs the processed image data to the OSD processing unit 34.

The OSD processing unit 34 performs a process of overlapping an OSD image of the menu screen, a message screen, or the like over the image data input from the image processing unit 33 based on an instruction of the control unit 20. The OSD processing unit 34 includes an OSD memory that is not shown in the drawing, and stores OSD image data indicating graphics, fonts, and the like for forming an OSD image. If the control unit 20 instructs overlapping of the OSD image, the OSD processing unit 34 reads necessary OSD image data from the OSD memory, and synthesizes the OSD image data with the image data input from the image processing unit 33 so that the OSD image is overlapped at a predetermined position of the input image. The image data synthesized with the OSD image data is output to the light valve driving unit 14. Furthermore, when there is no instruction from the control unit 20 to overlap the OSD image, the OSD processing unit 34 outputs the image data output from the image processing unit 33 to the light valve driving unit 14 without change.

When the light valve driving unit 14 drives the liquid crystal light valves 12R, 12G, and 12B in accordance with the image data input from the OSD processing unit 34, the liquid crystal light valves 12R, 12G, and 12B form an image according to the image data, and the image is projected from the projection lens 13.

Next, a lens adjustment operation performed by the projector 1 when there is a change in the image signal input to the signal analysis unit 32 will be described. Herein, a change in the image signal refers to a case where the type of image signal is changed, a case where a state without an input image signal is switched into a state with an input image signal, a case where the projector 1 recognizes the image signal after input of power, or the like.

Figure 4:
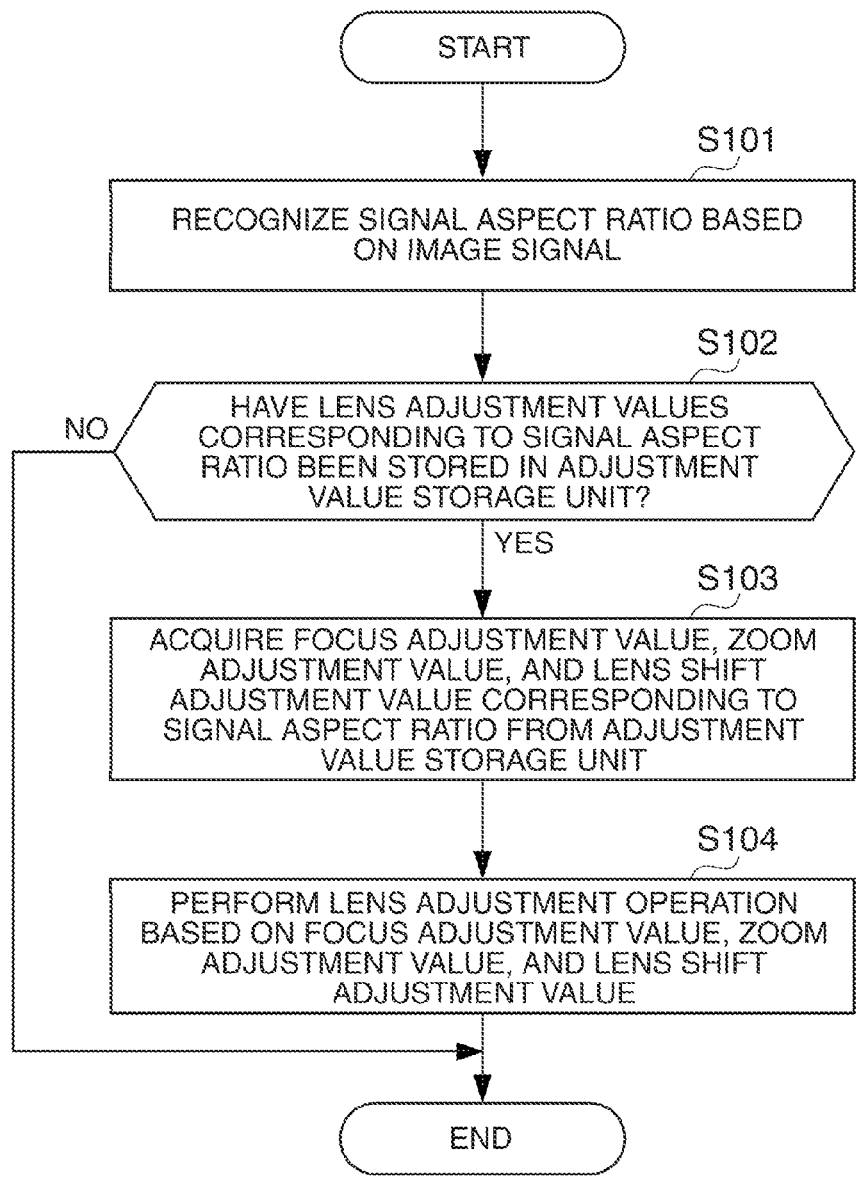
FIG. 4 is a flowchart of a lens adjustment process performed when there is a change in image signals.

FIG. 4 is a flowchart of a lens adjustment process performed when there is a change in the image signal input into the projector 1. The lens adjustment process when there is a change in the image signal will be described with reference to FIG. 4.

When the signal analysis unit 32 detects a change in the input image signal, the signal analysis unit 32 recognizes the signal aspect ratio based on the image signal and informs the control unit 20 of the information (Step S101). The control unit 20 determines whether or not the adjustment value storage unit 22 stores lens adjustment values corresponding to the signal aspect ratio (Step S102).

When the lens adjustment values have been stored (Step S102: YES), the control unit 20 acquires a focus adjustment value, a zoom adjustment value, and a lens shift adjustment value corresponding to the signal aspect ratio from the adjustment value storage unit 22 (Step S103). The control unit 20 at this time corresponds to an adjustment value acquisition unit.

The control unit 20 sends an instruction to the focus control unit 24, the zoom control unit 25, and the lens shift control unit 26, and causes a lens adjustment operation according to the focus adjustment value, the zoom adjustment value, and the lens shift adjustment value (Step S104). In other words, the focus control unit 24 performs focus adjustment so as to attain the acquired focus adjustment value, the zoom control unit 25 performs zoom adjustment so as to attain the acquired zoom adjustment value, and the lens shift control unit 26 performs lens shift adjustment so as to attain the acquired lens shift adjustment value. The control unit 20, the focus control unit 24, the zoom control unit 25, and the lens shift control unit 26 at this time correspond to an adjustment control unit. Then, the lens adjustment process performed when there is a change in the image signal ends.

When the lens adjustment values have not been stored (Step S102: NO), the lens adjustment operation is not performed, and the lens adjustment process performed when there is a change in the image signal ends.

According to the above-described first embodiment, the following effects are obtained.

(1) The projector 1 acquires the focus adjustment value, the zoom adjustment value, and the lens shift adjustment value corresponding to the signal aspect ratio of the image signal from the adjustment value storage unit 22 when there is a change in the input image signal. Then, the control unit 20 sends an instruction to the focus control unit 24, the zoom control unit 25, and the lens shift control unit 26 so as to cause a lens adjustment operation according to the focus adjustment value, the zoom adjustment value, and the lens shift adjustment value. Accordingly, since the projector 1 performs the lens adjustment operation corresponding to the signal aspect ratio of the image signal with the change operation of the image signal by the user, it is not necessary for the user to perform an operation for lens adjustment. In other words, when the user changes the image signal in order to switch a screen (SC1, or SC2) corresponding to the image signal, the user may not perform a lens adjustment operation. Therefore, it is possible to simplify a user operation. In addition, it is possible to shorten the time necessary for lens adjustment.

(2) The projector 1 causes the user to select an aspect ratio by displaying the lens adjustment value setting screen M1. At this time, if "aspect ratio of input signal" is selected, the aspect ratio of the image signal input at the time point and the lens adjustment values at that time point are stored in the adjustment value storage unit 22 by being linked to each other. Accordingly, the user can perform the lens adjustment work without confusion.

(3) The projector 1 causes the user to select an aspect ratio by displaying the lens adjustment value setting screen M1. At that time, if "4:3" or "16:9" is selected, the selected aspect ratio and the current lens adjustment values are stored in the adjustment value storage unit 22 by being linked to each other. Accordingly, the user who carries out the lens adjustment work can make the lens adjustment values stored by linking to an arbitrary aspect ratio, and therefore, convenience improves.

(4) The projector 1 stores the lens adjustment values (the focus adjustment value, the zoom adjustment value, and the lens shift adjustment value) corresponding to the signal aspect ratio. Accordingly, the user can separately use the screen SC1 or SC2 according to the signal aspect ratio of the input image signal, and therefore, convenience improves. In addition, it is also possible to use the projector by changing the lens adjustment values according to the signal aspect ratio for the same screen, which is advantageous.

Second Embodiment

Ina second embodiment, a projector will be described which performs a lens adjustment operation based on lens adjustment values corresponding to a signal aspect ratio and the type of input terminal 30a when the signal aspect ratio of the input image signal is changed.

A difference of a circuit configuration of a projector 100 according to the second embodiment from that of the projector 1 of the first embodiment shown in FIG. 1 lies in an adjustment value storage unit 22a. Since other constituent parts are the same as each other, description thereof will be omitted.

The adjustment value storage unit 22a includes a nonvolatile memory, and stores a focus adjustment value, a zoom adjustment value, and a lens shift adjustment value corresponding to the types of signal aspect ratios of an input signal and the types of input terminals 30a. The control unit 20 takes in charge of writing the focus adjustment value, the zoom adjustment value, and the lens shift adjustment value into the adjustment value storage unit 22a. In addition, the stored focus adjustment value, zoom adjustment value, and lens shift adjustment value are read by the control unit 20.

Herein, the adjustment value storage unit 22a will be described.

FIG. 5 is a descriptive diagram of the adjustment value storage unit 22a according to the second embodiment. As shown in FIG. 5, the adjustment value storage unit 22a stores the focus adjustment value, the zoom adjustment value, and the lens shift adjustment value as lens adjustment values corresponding to the types of signal aspect ratios of an input signal and the types of input terminals 30a. In the projector 100 of the embodiment, "4:3" and "16:9" are provided as the types of signal aspect ratios. In addition, as the types of input terminals 30a, "computer", "video", and "HDMI" are provided. In addition, the focus adjustment value, the zoom adjustment value, and the lens shift adjustment value are stored therein corresponding to the signal aspect ratios and the input terminals 30a. Furthermore, the types of signal aspect ratios are not limited thereto, and may include other types of signal aspect ratios. In addition, the types of input terminals 30a are not limited thereto, and may include other types of input terminals 30a. In addition, the adjustment value storage unit 22a may also store lens adjustment values corresponding to other types of signal aspect ratios and input terminals 30a.

Herein, a setting screen will be described which is used for storing lens adjustment values by being linked to the types of signal aspect ratios and the input terminals 30a in the adjustment value storage unit 22a.

Figure 6:
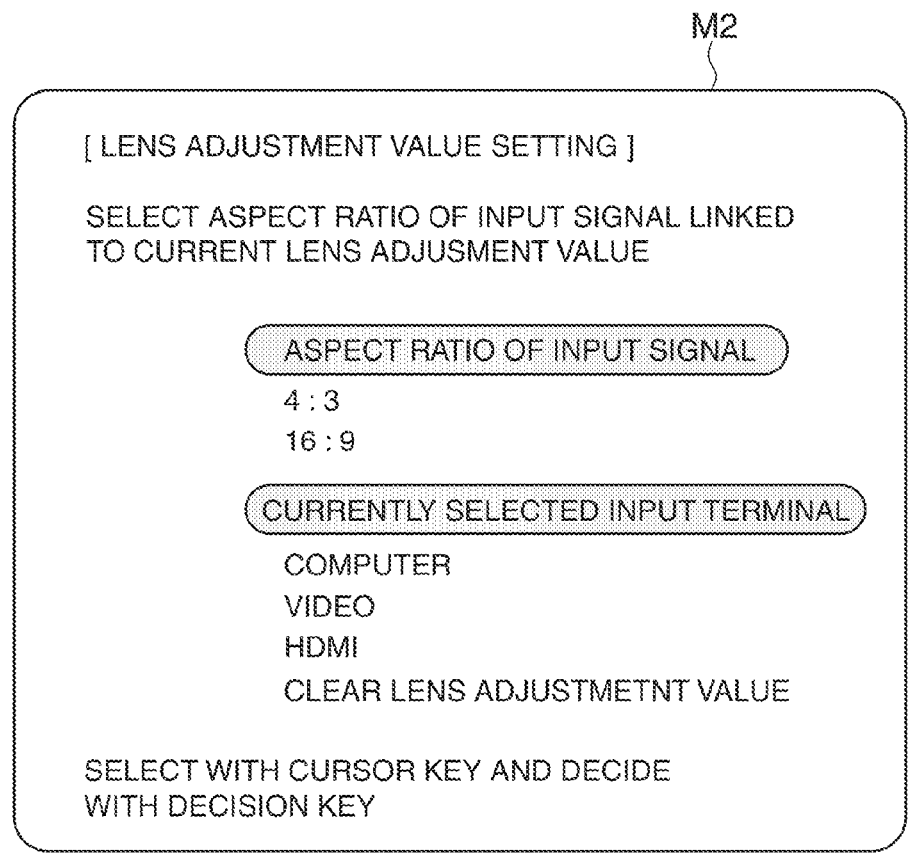
FIG. 6 is a descriptive diagram of another lens adjustment value setting screen.

FIG. 6 is a descriptive diagram of a lens adjustment value setting screen for setting the lens adjustment values by being linked to the types of signal aspect ratios and the input terminals 30a. A lens adjustment value setting screen M2 is displayed in such a way that the user depresses the menu key provided in the operation reception unit 21 and performs a predetermined operation. In the present embodiment, the lens adjustment value setting screen M2 is set to be OSD display, and displayed with an instruction of the control unit 20 to the OSD processing unit 34.

As shown in FIG. 6, in the uppermost part of the lens adjustment value setting screen M2, the character array of "Lens adjustment value setting" indicating a lens adjustment value setting screen is displayed. In the lower part thereof, the character array of "Select input terminal and aspect ratio of input signal linked to current lens adjustment value" for encouraging to select an input terminal 30a and a signal aspect ratio linked to the lens adjustment values is displayed. Furthermore, in the center of the screen, options of "aspect ratio of input signal", "4:3", and "16:9", options of "currently selected input terminal", "computer", "video", and "HDMI", and the option of "clear lens adjustment value" are displayed. In addition, in the lower part of the screen, explanation of a key input procedure is displayed.

If an aspect ratio and an input terminal are respective selected and decided on the lens adjustment value setting screen M2 by the user operating the operation reception unit 21, the control unit 20 causes the adjustment value storage unit 22a to store the current lens adjustment values (the focus adjustment value, the zoom adjustment value, and the lens shift adjustment value) by linking to the input terminal 30a and the signal aspect ratio selected. The operation reception unit 21 and the control unit 20 at that time correspond to storage control units. Herein, the "aspect ratio of input signal" is the aspect ratio of the image signal that has been currently input and recognized by the signal analysis unit 32. In addition, the "currently selected input terminal" is the input terminal 30a that has been currently selected by the input selection unit 31. Furthermore, in the present embodiment, default of the options is set to the "aspect ratio of input signal", and "currently selected input terminal". In addition, if the "clear lens adjustment value" is selected, the control unit 20 deletes (clears) all of the lens adjustment values stored in the adjustment value storage unit 22a. In other words, a state is set in which the lens adjustment values are not stored. Furthermore, the lens adjustment values stored in the adjustment value storage unit 22a may be set to be deleted (cleared) for each input terminal and signal aspect ratio. For example, it is possible for a screen (not shown in the drawing) for deleting lens adjustment values to be displayed, an input terminal and a single aspect ratio are selected by the user, and lens adjustment values linked to the selected input terminal and signal aspect ratio are deleted.

Next, an operation of lens adjustment performed by the projector 100 when there is a change in the image signal input to the signal analysis unit 32 will be described.

Figure 7:
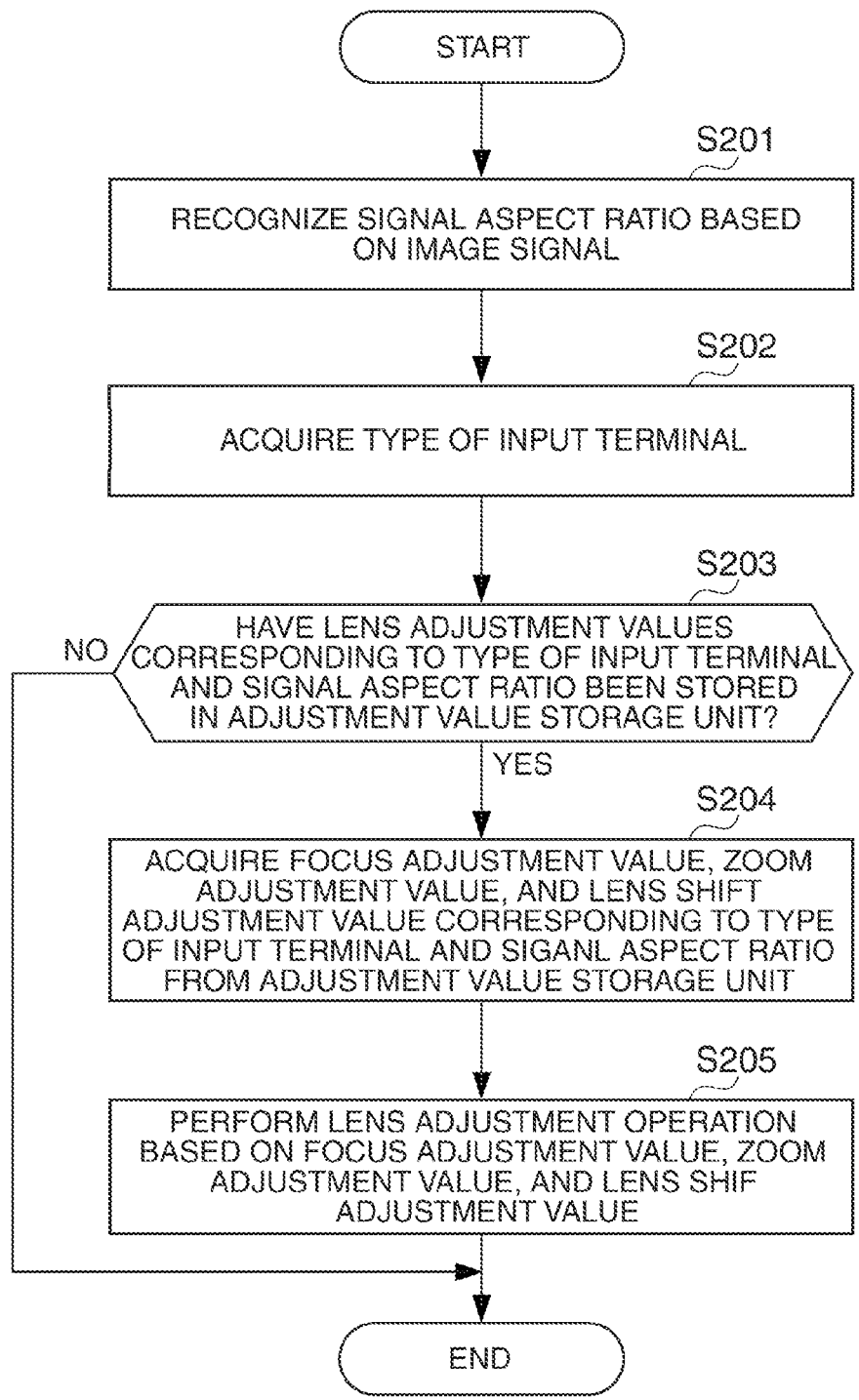
FIG. 7 is a flowchart of another lens adjustment process when there is a change in image signals.

FIG. 7 is a flowchart of a lens adjustment process performed when there is a change in the image signal input to the projector 100. The lens adjustment process when there is a change in the image signal will be described with reference to FIG. 7.

If the signal analysis unit 32 detects a change in the input image signal, the signal analysis unit 32 recognizes a signal aspect ratio based on the image signal, and informs the control unit 20 of the information (Step S201). The control unit 20 acquires the type of input terminal 30a selected by the input selection unit 31 (Step S202). The control unit 20 determines whether or not the adjustment value storage unit 22a stores lens adjustment values corresponding to the types of signal aspect ratio and the input terminal 30a (Step S203).

If the lens adjustment values has been stored (Step S203: YES), the control unit 20 acquires, from the adjustment value storage unit 22a, a focus adjustment value, a zoom adjustment value, and a lens shift adjustment value corresponding to the types of signal aspect ratio and the input terminal 30a (Step S204). The control unit 20 at that time corresponds to an adjustment value selection unit.

The control unit 20 sends an instruction to the focus control unit 24, the zoom control unit 25, and the lens shift control unit 26, and causes a lens adjustment operation according to the focus adjustment value, the zoom adjustment value, and the lens shift adjustment value (Step S205). In other words, the focus control unit 24 performs focus adjustment so as to attain the acquired focus adjustment value, the zoom control unit 25 performs zoom adjustment so as to attain the acquired zoom adjustment value, and the lens shift control unit 26 performs lens shift adjustment so as to attain the acquired lens shift adjustment value. Then, the lens adjustment process when there is a change in the image signal ends.

If the lens adjustment values have not been stored (Step S203: NO), the lens adjustment process when there is a change in the image signal ends without performing the lens adjustment operation.

According to the second embodiment described above, the following effects are obtained.

(1) The projector 100 acquires, from the adjustment value storage unit 22a, the focus adjustment value, the zoom adjustment value, and the lens shift adjustment value corresponding to the types of input terminal 30a and the signal aspect ratio of the image signal when there is a change in the input image signal. Then, the control unit 20 sends an instruction to the focus control unit 24, the zoom control unit 25, and the lens shift control unit 26 and causes the lens adjustment operation according to the focus adjustment value, the zoom adjustment value, and the lens shift adjustment value. Accordingly, the projector 100 performs the lens adjustment operation corresponding to the types of input terminal 30a and the signal aspect ratio of the image signal with an operation of changing the image signal by the user, and thus, it is not necessary for the user to perform an operation for lens adjustment. In other words, when an image signal is to be changed and then a screen is to be switched to the screen (SC1 or SC2) corresponding to the image signal, the user may not carry out the lens adjustment operation. Therefore, it is possible to simplify a user operation. In addition, the time necessary for lens adjustment can be shortened.

(2) The projector 100 causes the user to select an aspect ratio and an input terminal 30a by displaying the lens adjustment value setting screen M2. If "aspect ratio of input signal" is selected at that time, the signal aspect ratio of the image signal input at that time and the lens adjustment values at that time are linked to each other. In addition, if "currently selected input terminal" is selected, the input terminal 30a selected at that time and the lens adjustment values at that time are linked to each other. Then the results are stored in the adjustment value storage unit 22a. Accordingly, the user can carry out the lens adjustment work without confusion.

(3) The projector 100 causes the user to select an aspect ratio and an input terminal 30a by displaying the lens adjustment value setting screen M2. At this time, if "4:3" or "16:9" is selected, the selected aspect ratio and the current lens adjustment values are linked to each other. In addition, if "computer", "video", or "HDMI" is selected, the selected input terminal 30a and the current adjustment values are linked to each other. Then, the results are stored in the adjustment value storage unit 22a. Accordingly, the user who carries out the lens adjustment work can cause the lens adjustment values to be stored by being linked to the types of an arbitrary aspect ratio and an arbitrary input terminal 30a, whereby convenience improves.

(4) The projector 100 stores the lens adjustment values (the focus adjustment value, the zoom adjustment value, and the lens shift adjustment value) corresponding to the types of signal aspect ratio and the input terminal 30a. Accordingly, the user can separately use a screen SC1 or SC2 according to the signal aspect ratio of the input image signal, whereby convenience improves. In addition, it is possible to use the same screen by changing lens adjustment values thereof according to the types of signal aspect ratio and the input terminal 30a, whereby it is beneficial.

Third Embodiment

In a third embodiment, a projector will be described which, when setting of the aspect ratio of an image to be output (selection aspect ratio) is changed, performs a lens adjustment operation based on lens adjustment values corresponding to the selection aspect ratio.

Figure 8:
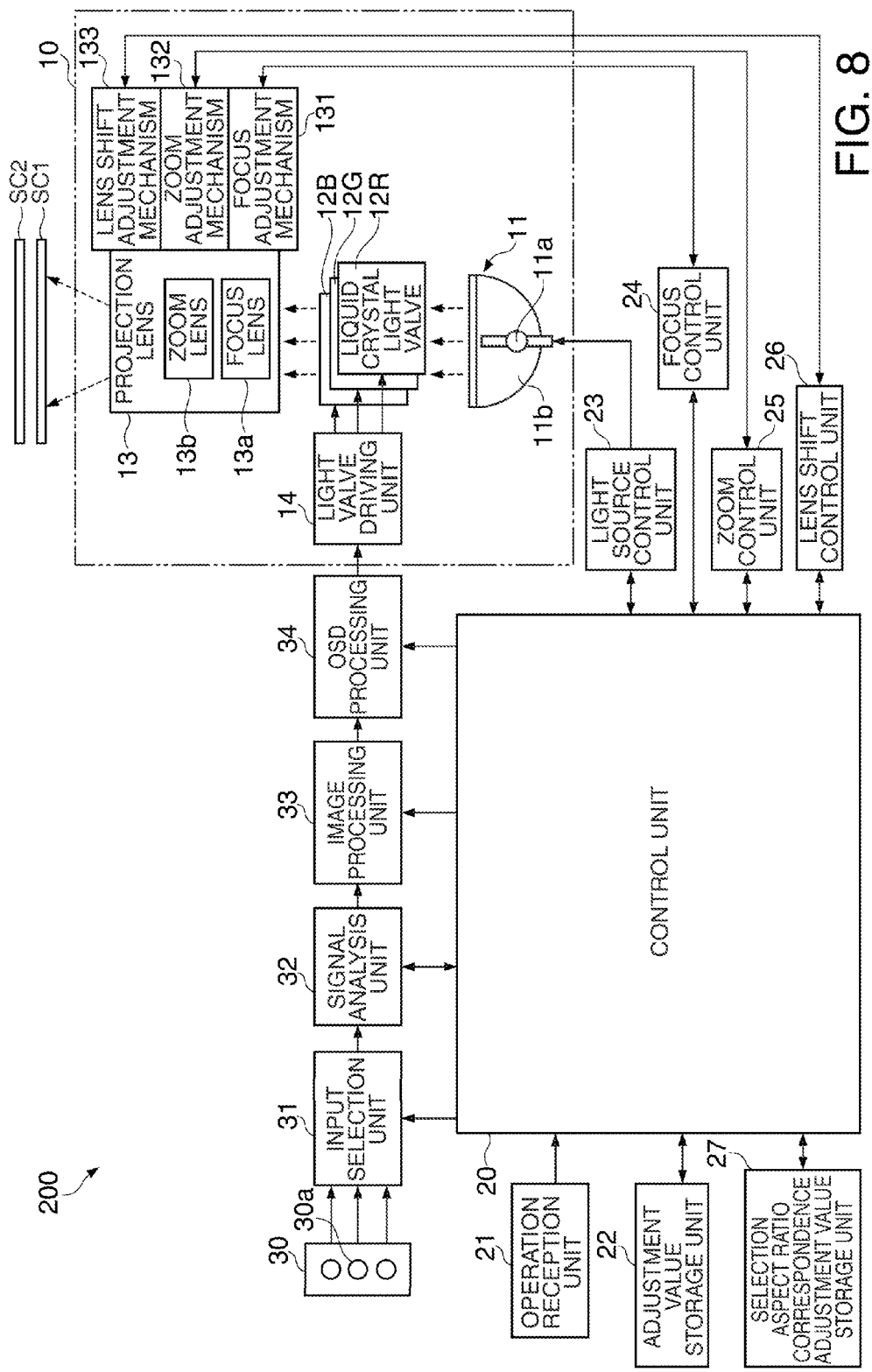
FIG. 8 is a block diagram showing a circuit configuration of a projector according to a third embodiment.

FIG. 8 is a block diagram showing a circuit configuration of a projector 200 according to the third embodiment. The internal configuration of the projector 200 will be described with reference to FIG. 8.

The circuit configuration of the projector 200 is obtained by adding a selection aspect ratio correspondence adjustment value storage unit 27 to the projector 1 of the first embodiment shown in FIG. 1. Since other constituent portions thereof are the same, description thereof will be omitted.

The selection aspect ratio correspondence adjustment value storage unit 27 includes a non-volatile memory, and stores a focus adjustment value, a zoom adjustment value, and a lens shift adjustment value corresponding to the type of selection aspect ratio. Writing of the focus adjustment value, the zoom adjustment value, and the lens shift adjustment value into the selection aspect ratio correspondence adjustment value storage unit 27 is performed by the control unit 20. In addition, the stored focus adjustment value, zoom adjustment value, and lens shift adjustment value are read by the control unit 20.

Herein, the selection aspect ratio correspondence adjustment value storage unit 27 will be described.

Figures 9, 10:
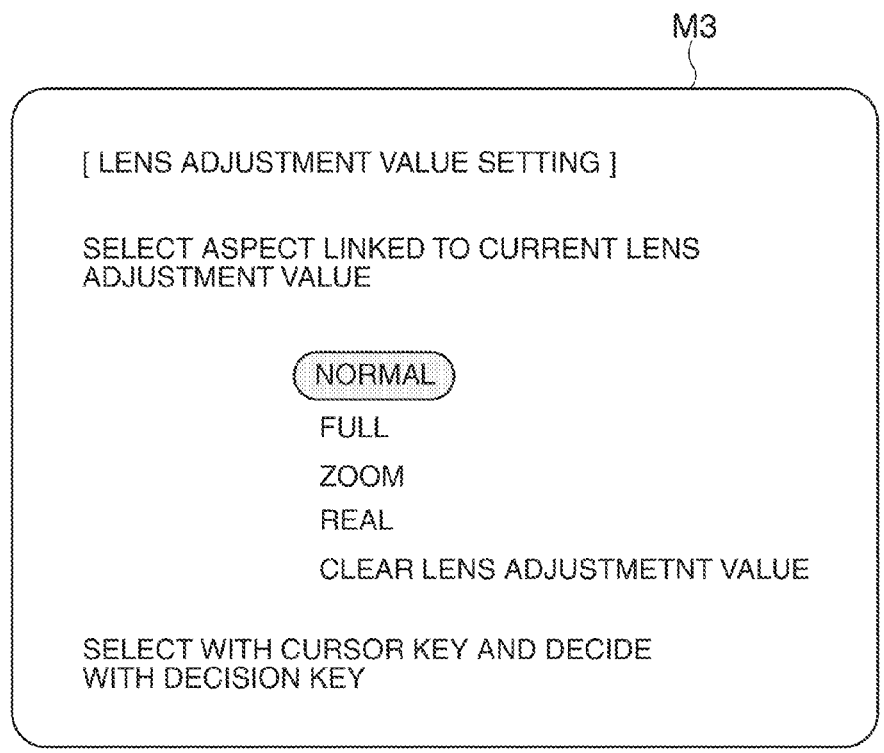
FIG. 9 is a descriptive diagram of a selection aspect ratio correspondence adjustment value storage unit.
FIG. 10 is a descriptive diagram of a lens adjustment value setting screen.

FIG. 9 is a descriptive diagram of the selection aspect ratio correspondence adjustment value storage unit 27. As shown in FIG. 9, the selection aspect ratio correspondence adjustment value storage unit 27 stores the focus adjustment value, the zoom adjustment value, and the lens shift adjustment value as lens adjustment values corresponding to the types of selection aspect ratios. The projector 200 of the present embodiment is provided with "normal", "full", "zoom", and "real" as the types of selection aspect ratios.

In the embodiment, "normal" is a mode in which an image is projected at the center of the screen by expanding the size of the horizontal or vertical direction to the full maximum resolution of the liquid crystal light valves 12R, 12G, and 12B with the aspect ratio of an input image signal fixed. "Full" is a mode in which an image is projected by expanding the size to the full resolution of the liquid crystal light valves 12R, 12G, and 12B. "Zoom" is a mode in which an image is projected so that the size of the horizontal direction is expanded to the full resolution of the liquid crystal light valves 12R, 12G, and 12B without changing the aspect ratio of the input image. At this time, the portion exceeding the liquid crystal light valves 12R, 12G, and 12B is not projected. "Real" is a mode in which an image is projected without changing the input resolution.

In addition, the selection aspect ratio correspondence adjustment value storage unit 27 stores the focus adjustment value, the zoom adjustment value, and the lens shift adjustment value corresponding to such types of the selection aspect ratios. Furthermore, the types of selection aspect ratios are not limited thereto, and may be provided with other types of selection aspect ratios. In addition, the selection aspect ratio correspondence adjustment value storage unit 27 may store lens adjustment values corresponding to the types of selection aspect ratios.

Herein, a setting screen for causing the selection aspect ratio correspondence adjustment value storage unit 27 to lens adjustment values by linking to the types of selection aspect ratios will be described.

FIG. 10 is a descriptive diagram of a lens adjustment value setting screen for setting lens adjustment values by linking to the types of selection aspect ratios. A lens adjustment value setting screen M3 is displayed in such a way that the user presses down the menu key provided in the operation reception unit 21 so as to perform a predetermined operation. In the embodiment, the lens adjustment value setting screen M3 is set to be an OSD display, and displayed in such a way that the control unit 20 gives an instruction to the OSD processing unit 34.

As shown in FIG. 10, in the uppermost part of the lens adjustment value setting screen M3, a character array of "lens adjustment value setting" indicating to be a lens adjustment value setting screen is displayed. Below the array, a character array of "Select an aspect linked to current lens adjustment value" for encouraging selection of a selection aspect ratio linked to lens adjustment values is displayed. Furthermore, at the center of the screen, options of "normal", "full", "zoom", "real", and "clear lens adjustment value" are displayed. In addition, in the lower part of the screen, explanation on the key input procedure is displayed.

If the user selects a selection aspect ratio and decides a ratio with the decision key on the lens adjustment value setting screen M3 by operating the operation reception unit 21, the control unit 20 causes the selection aspect ratio correspondence adjustment value storage unit 27 to store the current lens adjustment values (the focus adjustment value, the zoom adjustment value, and the lens shift adjustment value) by linking to the selected selection aspect ratio. The operation reception unit 21 and the control unit 20 at that time correspond to selection storage control units. Furthermore, in the embodiment, the default of the options is set to "normal". In addition, if "clear lens adjustment value" is selected, the control unit 20 deletes (clears) all of the lens adjustment values stored in the selection aspect ratio correspondence adjustment value storage unit 27. In other words, a state is set in which the lens adjustment values are not stored. Furthermore, the lens adjustment values stored in the selection aspect ratio correspondence adjustment value storage unit 27 may be deleted (cleared) for each selection aspect ratio. For example, it is possible for a screen for deleting the lens adjustment values (not shown in the drawing) to be displayed, the user selects a selection aspect ratio, and the lens adjustment values linked to the selected selection aspect ratio are deleted.

Next, a lens adjustment operation will be described which is performed by the projector 200 when the types of selection aspect ratios ("normal", "full", "zoom", and "real") are switched with an operation of a projection aspect ratio change key provided in the operation reception unit 21. Furthermore, the control unit of when a selection aspect ratio is switched by operating the projection aspect ratio change key corresponds to an aspect ratio selection unit.

Figure 11:
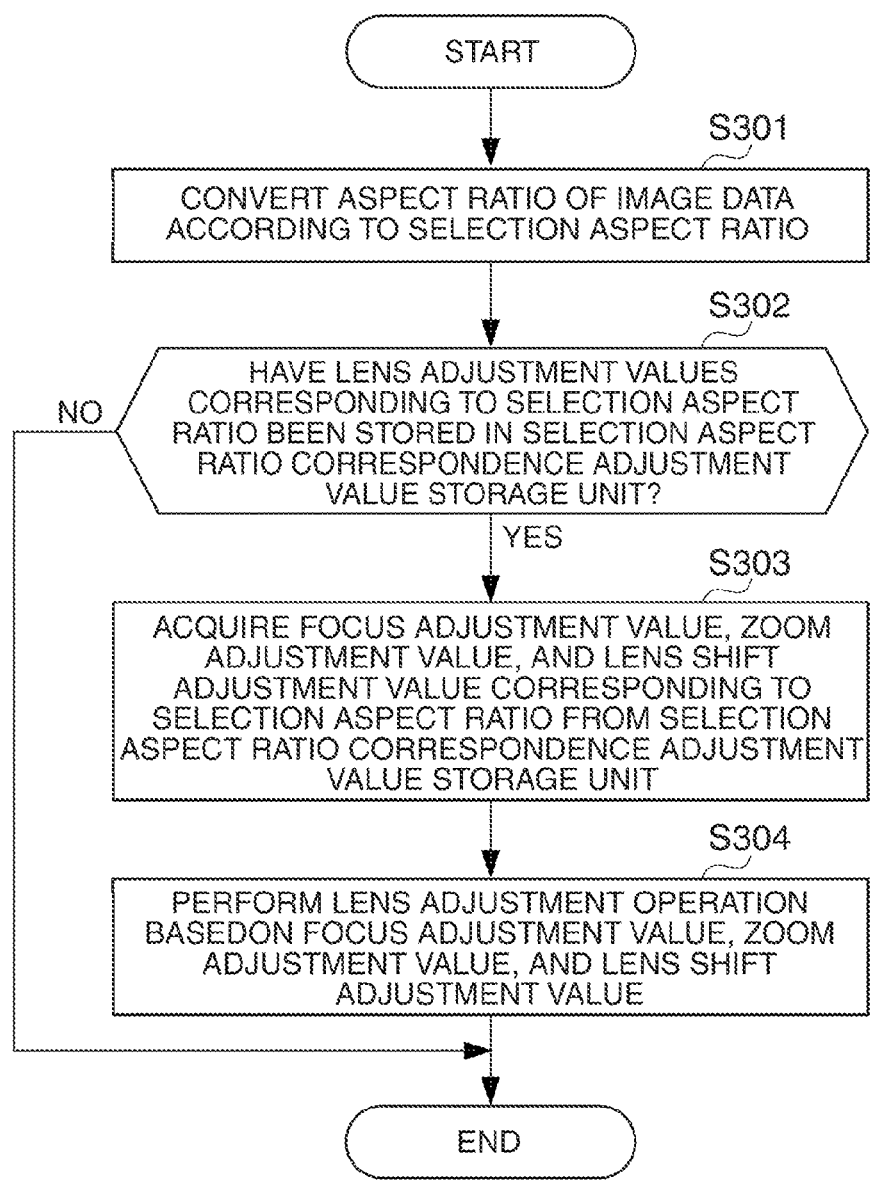
FIG. 11 is a flowchart of still another lens adjustment process performed when the type of selection aspect ratio is switched.

FIG. 11 is a flowchart of a lens adjustment process performed when the type of selection aspect ratio of the projector 200 is switched. The lens adjustment process during switching of the selection aspect ratio will be described with reference to FIG. 11.

When the type of selection aspect ratio is switched with the operation of the projection aspect ratio change key provided in the operation reception unit 21, the control unit 20 sends an instruction to the image processing unit 33 to convert the aspect ratio of image data corresponding to the selection aspect ratio (Step S301). The control unit 20 and the image processing unit 33 at that time correspond to image aspect ratio conversion units. The control unit 20 determined whether or not the selection aspect ratio correspondence adjustment value storage unit 27 stores lens adjustment values corresponding to the selection aspect ratio (Step S302).

If the lens adjustment values have been stored (Step S302: YES), the control unit 20 acquires a focus adjustment value, a zoom adjustment value, and a lens shift adjustment value corresponding to the selection aspect ratio from the selection aspect ratio correspondence adjustment value storage unit 27 (Step S303). The control unit 20 at this time corresponds to an adjustment value selection unit.

The control unit 20 sends an instruction to the focus control unit 24, the zoom control unit 25, and the lens shift control unit 26 to cause the lens adjustment operation according to the focus adjustment value, the zoom adjustment value, and the lens shift adjustment value (Step S304). In other words, the focus control unit 24 performs focus adjustment so as to attain the acquired focus adjustment value, the zoom control unit 25 performs zoom adjustment so as to attain the acquired zoom adjustment value, and the lens shift control unit 26 performs lens shift adjustment so as to attain the acquired lens shift adjustment value. Then, the lens adjustment process performed when the selection aspect ratio is switched ends.

If the lens adjustment values have not been stored (Step S302: NO), the lens adjustment process performed when the selection aspect ratio is switched ends without performing the lens adjustment operation.

According to the third embodiment described above, the following effects are obtained.

(1) The projector 200 acquires the focus adjustment value, the zoom adjustment value, and the lens shift adjustment value corresponding to the selection aspect ratio from the selection aspect ratio correspondence adjustment value storage unit 27 when the selection aspect ratio is switched. Then, the control unit 20 sends an instruction to the focus control unit 24, the zoom control unit 25, and the lens shift control unit 26 and causes the lens adjustment operation according to the focus adjustment value, the zoom adjustment value, and the lens shift adjustment value. Accordingly, the projector 200 performs the lens adjustment operation corresponding to the selection aspect ratio with a switching operation of the selection aspect ratio by the user, and therefore, it is not necessary for the user to carry out an operation for lens adjustment. In other words, when the selection aspect ratio is to be switched to, and then a screen is to be switched to the screen (SC1 or SC2) corresponding to the selection aspect ratio, the user may not carry out the lens adjustment operation. Therefore, it is possible to simplify a user operation. In addition, the time necessary for lens adjustment can be shortened.

(2) The projector 200 helps the user to select the selection aspect ratio by displaying the lens adjustment value setting screen M3. Then, the selection aspect ratio is stored in the selection aspect ratio correspondence adjustment value storage unit 27 by being linked to the current lens adjustment values. Accordingly, the user who carries out the lens adjustment work can make the lens adjustment values by linking to an arbitrary selection aspect ratio, whereby convenience improves.

(3) The projector 200 stores the lens adjustment values (the focus adjustment value, the zoom adjustment value, and the lens shift adjustment value) corresponding to the selection aspect ratio. Accordingly, the user can separately use the screen SC1 or SC2 according to the selection aspect ratio, whereby convenience improves. In addition, it is also possible to use the projector by changing the lens adjustment values according to the selection aspect ratio for the same screen, which is advantageous.

Furthermore, the invention is not limited to the above-described embodiments, and can be implemented in addition to various modifications, improvements or the like. Modified examples thereof will be described below.

Modified Example 1

In the above embodiments, the adjustment value storage unit 22 (and 22a) and the selection aspect ratio correspondence adjustment value storage unit 27 is set to store the lens adjustment values of each type of signal aspect ratio, the input terminal 30a, and the selection aspect ratio, but may store the values by numbering each of the lens adjustment values (combination of the focus adjustment value, the zoom adjustment value, and the lens shift adjustment value). In this case, the adjustment value storage unit 22 (and 22a) and the selection aspect ratio correspondence adjustment value storage unit 27 store the numbers of the lens adjustment values by linked to the above factors. In addition, in order to make the numbers correspond to the lens adjustment values, for example, a screen (not shown in the drawings) for storing the numbers of the lens adjustment values is set to be displayed to assist the user in storing the lens adjustment values and the numbers. Then, by setting to display a screen (not shown in the drawings) for selecting the number of a lens adjustment value, the user is caused to select the number of the lens adjustment value to acquire the lens adjustment value, thereby being able to perform the lens adjustment operation.

Modified Example 2

In the above embodiments, the adjustment value storage unit 22 (and 22*a*) and the selection aspect ratio correspondence adjustment value storage unit 27 store the lens adjustment values corresponding to all of the types of signal aspect ratios, the types of input terminals 30*a*, and the types of selection aspect ratios that are disclosed, but it is not necessary to store lens adjustment values corresponding to all of the types. For example, lens adjustment values may be set not to be stored for the types of signal aspect ratios, the types of input terminals 30*a*, and the types of selection aspect ratios that are not used, and when the lens adjustment values that are not stored is to be read (acquired), a screen indicating the intent that the values are not stored may be displayed.

Modified Example 3

In the above embodiments, the operation of selecting the selection aspect ratio and other key operations are set to be performed by the operation keys provided in the operation reception unit 21, but it is possible that a communication unit (not shown in the drawings) may be provided in the projectors 1, 100, and 200 so as to receive signals of the operation of selecting the selection aspect ratio and of other key operations through communication from external electric equipment (not shown in the drawings).

Modified Example 4

In the above embodiments, the light source 11 is configured to be a discharge type light source lamp 11*a*, but a solid-state light source such as an LED (Light Emitting Diode) light source, a laser beam, or the like, or other light sources may also be used.

Modified Example 5

In the above embodiment, as light conversion devices of the projectors 1, 100, and 200, the transmissive type liquid crystal light valves 12R, 12G, and 12B are used, but a reflective type light conversion device such as a reflective type liquid crystal light valve, or the like can also be used. In addition, a minute mirror array device, or the like, can also be used, which modulates light emitted from a light source by controlling the emission direction of incident light with each micro-mirror as a pixel.

The entire disclosure of Japanese Patent Application No. 2011-56263, filed Mar. 15, 2011 is expressly incorporated by reference herein.

What is claimed is:

1. A projector comprising:
a light source;
a light modulation device that modulates light emitted from the light source into image light according to an image signal;
a projection lens that projects the image light modulated by the light modulation device;
a lens adjustment mechanism that performs a predetermined adjustment operation for the projection lens;
an adjustment value storage unit that stores lens adjustment values for causing the lens adjustment mechanism to perform the predetermined adjustment operation by linking the lens adjustment values to the type of aspect ratio of the image signal;
an input terminal unit that includes an input terminal into which the image signal is input;
a signal aspect ratio recognition unit that recognizes an aspect ratio of the image signal input to the input terminal;
an adjustment value acquisition unit that acquires, from the adjustment value storage unit, the lens adjustment values corresponding to the type of aspect ratio recognized by the signal aspect ratio recognition unit;
an adjustment control unit that causes the lens adjustment mechanism to perform a lens adjustment operation based on the lens adjustment values acquired by the adjustment value acquisition unit;
an aspect ratio selection unit that selects one of selection aspect ratios selectable as an aspect ratio of the image signal;
an image aspect ratio conversion unit that converts an aspect ratio of an image based on the image signal input to the input terminal into a selection aspect ratio selected by the aspect ratio selection unit; and
a selection aspect ratio correspondence adjustment value storage unit that stores the lens adjustment values by linking the lens adjustment values to the types of selection aspect ratios that are selectable,
wherein, when the selection aspect ratio is selected by the aspect ratio selection unit, the adjustment value acquisition unit acquires, from the selection aspect ratio correspondence adjustment value storage unit, the lens adjustment values corresponding to the selection aspect ratio.

2. The projector according to claim 1, wherein the predetermined adjustment operation by the lens adjustment mechanism is at least one of a focus adjustment operation for focusing, a zoom adjustment operation for adjusting a projection view angle, and a lens shift adjustment operation for adjusting the projection position of an image by moving the projection lens.

3. The projector according to claim 1,
wherein the adjustment value storage unit stores the lens adjustment values by linking the lens adjustment values to the types of aspect ratio of the image signal and the type of input terminal, and
wherein the adjustment value acquisition unit acquires, from the adjustment value storage unit, the lens adjustment values corresponding to the type of aspect ratio and the type of input terminal.

4. The projector according to claim 3, further comprising:
a storage control unit that causes the adjustment value storage unit to store the lens adjustment values by linking the lens adjustment values to the type of aspect ratio of the image signal and the type of input terminal,
wherein the storage control unit causes the adjustment value storage unit to store the lens adjustment values by linking the lens adjustment values to the type of input terminal and the type of aspect ratio of the image signal input to the input terminal at the time when the adjustment value storage unit stores the lens adjustment values.

5. The projector according to claim 3, further comprising:
a storage control unit that causes the adjustment value storage unit to store the lens adjustment values by linking the lens adjustment values to the type of aspect ratio of the image signal and the type of input terminal; and
an operation reception unit that receives an operation,
wherein, when the operation reception unit receives a selection operation of the type of aspect ratio and the type of input terminal, the storage control unit causes the adjustment value storage unit to store the lens adjustment values by linking the lens adjustment values to the type of aspect ratio and the type of input terminal that are selected in the selection operation.

6. The projector according to claim 1, further comprising:
a storage control unit that causes the adjustment value storage unit to store the lens adjustment values by linking the lens adjustment values to the type of aspect ratio,
wherein the storage control unit causes the adjustment value storage unit to store the lens adjustment values by linking the lens adjustment values to the type of aspect ratio of the image signal that has been inputting to the input terminal at the time when the adjustment value storage unit stores the lens adjustment values.

7. The projector according to claim 1, further comprising:
a storage control unit that causes the adjustment value storage unit to store the lens adjustment values by linking the lens adjustment values to the type of aspect ratio; and
an operation reception unit that receives an operation,
wherein, when the operation reception unit receives a selection operation of the type of aspect ratio, the storage control unit causes the adjustment value storage unit to store the lens adjustment values by linking the lens adjustment values to the type of aspect ratio selected in the selection operation.

8. The projector according to claim 1, further comprising:
a selection storage control unit that causes the selection aspect ratio correspondence adjustment value storage unit to store the lens adjustment values by linking the lens adjustment values to type of selection aspect ratio; and
an operation reception unit that receives an operation,
wherein, when the operation reception unit receives a selection operation of the type of selection aspect ratio, the selection storage control unit causes the selection aspect ratio correspondence adjustment value storage unit to store the lens adjustment values by linking the lens adjustment values to the type of selection aspect ratio selected in the selection operation.

9. A control method of a projector that includes a light source, a light modulation device that modulates light emitted from the light source into image light according to an image signal, a projection lens that projects the image light modulated by the light modulation device, a lens adjustment mechanism that performs a predetermined adjustment operation for the projection lens, an adjustment value storage unit that stores lens adjustment values for causing the lens adjustment mechanism to perform the predetermined adjustment operation by linking the lens adjustment values to the type of aspect ratio of the image signal, and an input terminal unit that includes an input terminal into which the image signal is input, the method comprising:
recognizing the aspect ratio of the image signal input to the input terminal;
acquiring, from the adjustment value storage unit, the lens adjustment values corresponding to the type of aspect ratio recognized in the recognizing; and
controlling the lens adjustment mechanism to perform a lens adjustment operation based on the lens adjustment values acquired in the acquiring,
wherein the projector further includes a selection aspect ratio correspondence adjustment value storage unit that stores the lens adjustment values by linking the lens adjustment values to the types of selection aspect ratios that are selectable as an aspect ratio of the image signal, and
wherein one selection aspect ratio is selected from the selection aspect ratios that are selectable, the aspect ratio of the image is converted to the selection aspect ratio that is selected based on the image signal input to the input terminal, and the lens adjustment values corresponding to the selection aspect ratio that is selected from the selection aspect ratio correspondence adjustment value storage unit.

10. The control method of a projector according to claim 9, wherein the lens adjustment mechanism is caused to perform at least one of a focus adjustment operation for focusing, a zoom adjustment operation for adjusting a projection view angle, and a lens shift adjustment operation for adjusting the projection position of an image by moving the projection lens, as the lens adjustment operation.

11. The control method of a projector according to claim 9,
wherein the lens adjustment values are stored by being linked to the type of aspect ratio of the image signal and the type of input terminal, and
wherein the lens adjustment values corresponding to the type of aspect ratio and the type of input terminal are acquired from the adjustment value storage unit.

12. The control method of a projector according to claim 11,
wherein the lens adjustment values are stored by linking the lens adjustment values to the type of input terminal and the type of aspect ratio of the image signal input to the input terminal at the time when the adjustment value storage unit stores the values.

13. The control method of a projector according to claim 11,
wherein a selection operation of the type of aspect ratio and the type of input terminal is received, and
wherein the adjustment values storage unit is caused to store the lens adjustment values by linking the lens adjustment values to the type of aspect ratio and the type of input terminal selected in the selection operation.

14. The control method of a projector according to claim 9, wherein the lens adjustment values are stored by linking the lens adjustment values to the type of aspect ratio of the image signal input to the input terminal at the time when the adjustment value storage unit stores the values.

15. The control method of a projector according to claim 9,
wherein a selection operation of the type of aspect ratio is received, and
wherein the adjustment value storage unit is caused to store the lens adjustment values by linking the lens adjustment values to the type of aspect ratio selected in the selection operation.

16. The control method of a projector according to claim 9,
wherein a selection operation of the type of selection aspect ratio is received, and
wherein the selection aspect ratio correspondence adjustment values storage unit is caused to store the lens adjustment values by linking the lens adjustment values to the type of selection aspect ratio selected in the selection operation.

17. A projector comprising:
a light source;
a light modulation device that modulates light emitted from the light source into image light according to an image signal;
a projection lens that projects the image light modulated by the light modulation device;
a lens adjustment mechanism that performs a predetermined adjustment operation for the projection lens;
an adjustment value storage unit that stores lens adjustment values for causing the lens adjustment mechanism to perform the predetermined adjustment operation by linking the lens adjustment values to the type of aspect ratio of the image signal;
an input terminal unit that includes an input terminal into which the image signal is input;
a signal aspect ratio recognition unit that recognizes an aspect ratio of the image signal input to the input terminal;
an adjustment value acquisition unit that acquires, from the adjustment value storage unit, the lens adjustment values corresponding to the type of aspect ratio recognized by the signal aspect ratio recognition unit; and
an adjustment control unit that causes the lens adjustment mechanism to perform a lens adjustment operation based on the lens adjustment values acquired by the adjustment value acquisition unit,
wherein the adjustment value storage unit stores the lens adjustment values by linking the lens adjustment values to the types of aspect ratio of the image signal and the type of input terminal, and
wherein the adjustment value acquisition unit acquires, from the adjustment value storage unit, the lens adjustment values corresponding to the type of aspect ratio and the type of input terminal.

18. A projector comprising:
a light source;
a light modulation device that modulates light emitted from the light source into image light according to an image signal;
a projection lens that projects the image light modulated by the light modulation device;
a lens adjustment mechanism that performs a predetermined adjustment operation for the projection lens;
an adjustment value storage unit that stores lens adjustment values for causing the lens adjustment mechanism to perform the predetermined adjustment operation by linking the lens adjustment values to the type of aspect ratio of the image signal;
an input terminal unit that includes an input terminal into which the image signal is input;
a signal aspect ratio recognition unit that recognizes an aspect ratio of the image signal input to the input terminal;
an adjustment value acquisition unit that acquires, from the adjustment value storage unit, the lens adjustment values corresponding to the type of aspect ratio recognized by the signal aspect ratio recognition unit;
an adjustment control unit that causes the lens adjustment mechanism to perform a lens adjustment operation based on the lens adjustment values acquired by the adjustment value acquisition unit; and
a storage control unit that causes the adjustment value storage unit to store the lens adjustment values by linking the lens adjustment values to the type of aspect ratio,
wherein the storage control unit causes the adjustment value storage unit to store the lens adjustment values by linking the lens adjustment values to the type of aspect ratio of the image signal that has been inputting to the input terminal at the time when the adjustment value storage unit stores the lens adjustment values.

19. A projector comprising:
a light source;
a light modulation device that modulates light emitted from the light source into image light according to an image signal;
a projection lens that projects the image light modulated by the light modulation device;
a lens adjustment mechanism that performs a predetermined adjustment operation for the projection lens;
an adjustment value storage unit that stores lens adjustment values for causing the lens adjustment mechanism to perform the predetermined adjustment operation by linking the lens adjustment values to the type of aspect ratio of the image signal;
an input terminal unit that includes an input terminal into which the image signal is input;
a signal aspect ratio recognition unit that recognizes an aspect ratio of the image signal input to the input terminal;
an adjustment value acquisition unit that acquires, from the adjustment value storage unit, the lens adjustment values corresponding to the type of aspect ratio recognized by the signal aspect ratio recognition unit;
an adjustment control unit that causes the lens adjustment mechanism to perform a lens adjustment operation based on the lens adjustment values acquired by the adjustment value acquisition unit;
a storage control unit that causes the adjustment value storage unit to store the lens adjustment values by linking the lens adjustment values to the type of aspect ratio; and
an operation reception unit that receives an operation,
wherein, when the operation reception unit receives a selection operation of the type of aspect ratio, the storage control unit causes the adjustment value storage unit to store the lens adjustment values by linking the lens adjustment values to the type of aspect ratio selected in the selection operation.

* * * * *